US008482642B2

United States Patent
Rysinski

(10) Patent No.: US 8,482,642 B2
(45) Date of Patent: *Jul. 9, 2013

(54) DUAL PINNED DIODE PIXEL WITH SHUTTER

(75) Inventor: Jeffrey Rysinski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,599

(22) Filed: Oct. 31, 2011

(65) Prior Publication Data

US 2012/0044396 A1 Feb. 23, 2012

Related U.S. Application Data

(63) Continuation of application No. 10/928,310, filed on Aug. 30, 2004, now Pat. No. 8,072,520.

(51) Int. Cl.
*H04N 3/14* (2006.01)
*H04N 5/335* (2011.01)
*H01L 27/00* (2006.01)

(52) U.S. Cl.
USPC ........... 348/296; 348/294; 348/302; 348/308; 250/208.1

(58) Field of Classification Search
USPC ........ 348/294–324; 250/208.1; 257/291–292, 257/359, 431–445
See application file for complete search history.

(56) References Cited

U.S. PATENT DOCUMENTS

| 5,898,168 | A | 4/1999 | Gowda et al. |
|---|---|---|---|
| 6,141,050 | A | 10/2000 | Ackland et al. |
| 6,285,398 | B1 | 9/2001 | Shinsky et al. |
| 6,522,357 | B2 | 2/2003 | Beiley et al. |
| 6,556,244 | B1 | 4/2003 | So et al. |
| 7,064,362 | B2 | 6/2006 | Roy |
| 7,067,792 | B2 | 6/2006 | Cazaux et al. |
| 7,105,793 | B2 | 9/2006 | Rhodes |
| 7,332,786 | B2 | 2/2008 | Altice et al. |
| 2003/0103153 | A1 | 6/2003 | Fossum |
| 2004/0036784 | A1 | 2/2004 | Bock |
| 2005/0110093 | A1 | 5/2005 | Altice et al. |
| 2005/0110884 | A1 | 5/2005 | Altice et al. |
| 2006/0044243 | A1 | 3/2006 | Rysinski |
| 2006/0146159 | A1 | 7/2006 | Farrier |
| 2006/0243887 | A1 | 11/2006 | Boemler |
| 2009/0108176 | A1 | 4/2009 | Blanquart |
| 2009/0141155 | A1 | 6/2009 | Ellis-Monaghan et al. |

FOREIGN PATENT DOCUMENTS

EP 1509038 1/2004

OTHER PUBLICATIONS

CMOS Image Sensor With NMOS-Only Global Shutter and Enhanced Responsivity, IEEE Transactions on Electron Devices, vol. 50, No. 1, Jan. 2003 (6 pages).
A 128 × 128-Pixel Standard-CMOS Image Sensor with Electronic Shutter, IEEE Journal of Solid-State Circuits, vol. 31, No. 12, Dec. 1996 (9 pages).

*Primary Examiner* — Michael Osinski
(74) *Attorney, Agent, or Firm* — Dickstein Shapiro LLP

(57) ABSTRACT

A pixel having an electronic shutter suitable for use in a pixel array of an imaging device includes a pinned diode and a shutter transistor. The pinned diode is utilized as a storage device while the shutter transistor controls charge transfer from the electronic shutter. The use of a pinned diode as a charge storage device for the electronic shutter permits greater charge transfer efficiency, has lower leakage (or "dark" current), and permits the resulting pixel to have a greater fill factor than pixels utilizing conventional electronic shutter circuits.

19 Claims, 6 Drawing Sheets

DUAL PINNED DIODE PIXEL WITH SHUTTER

CROSS REFERENCE TO RELATED APPLICATIONS

The present application is a continuation of U.S. patent application Ser. No. 10/928,310 filed on Aug. 30, 2004 now U.S. Pat. No. 8,072,520, which is incorporated by reference in its entirety.

FIELD OF INVENTION

The present invention relates generally to semiconductor imagers. More specifically, the present invention relates to a pixel architecture supporting an electronic shutter.

BACKGROUND OF THE INVENTION

FIG. 1 illustrates a conventional four transistor (4T) imager pixel 100 coupled via interconnect 125 to a conventional pixel reading circuit 150. The pixel 100 includes a photodiode 101, reset, source follower, row select, and transfer transistors 110-114, and nodes A, B, E, and P. Control signals RESET, TX, and ROW are respectively applied to the gates of the reset transistor 110, the transfer transistor 114, and the row select transistor 112. Node A is connected to a supply voltage source (VAAPIX) for the pixel 100. Node E is a charge storage node. Node P is a charge accumulation node of the photodiode 101. The outputs produced by the pixel 100 are made available at node B. These outputs include a reset output voltage Vrst and a pixel image signal output voltage Vsig. A bias circuit 113 biases a column line 125 between the pixel and a sample and hold circuit 152. The pixel reading circuit 150 includes a photo signal sample-and-hold (S/H) circuit SHS 151 for sampling and holding the Vsig output voltage, a reset signal S/H circuit SHR 152 for sampling and holding the Vrst output voltage, a differential amplifier 153, and nodes C and D. As illustrated, column line 125 couples the output of the pixel at node B to the input of the pixel reading circuit at node C.

The pixel 100 is operated by asserting the ROW control signal to cause the row select transistor 112 to conduct. The RESET control signal is asserted to cause a reset voltage from node A (e.g., VAAPIX) to be applied to charge storage node E. The RESET control signal is then deasserted. The pixel 100 outputs a reset signal Vrst through transistors 111 and 112, which is sampled and held by circuit 152. The photodiode 101 is exposed to light during a charge integration period, i.e., an exposure period. Upon completion of the integration, the accumulated charge is transferred to storage node E by transistor 114 (when TX is applied) causing the pixel 100 to output a photo signal Vsig through transistors 111 and 112 and sampled and held by circuit 151. Both the reset signal Vrst and the photo signal Vsig are output at node B, albeit at different times. During the exposure, the photodiode 101 produces a current related to the amount of incident light. Charge accumulates at node P based on the intensity of the incident light and the amount of time the transfer transistor 114 is non-conducting. When the transfer transistor 114 becomes conductive, the charge accumulated at node P is transferred through the transfer transistor 114 to storage node E.

As noted, the reset signal Vrst is sampled and held by the reset signal S/H circuit 152, while the photo signal Vsig is sampled and held by the photo signal S/H circuit 151. The sampled and held photo and reset signals are supplied as inputs to differential amplifier 153, which generates the signal (Vrst−Vsig). The resulting amplified output signal is available at node D for analog-to-digital conversion.

FIG. 2 is a block diagram of an imager 200 having a pixel array 201. Pixel array 201 comprises a plurality of pixels 100 arranged in a predetermined number of columns and rows. Each pixel 100 of array 200 may have the architecture as shown in FIG. 1 or other well-known pixel architectures.

Typically, the imager 200 is operated on a rolling shutter basis, in which the rows of pixels are turned on at different times on a rolling basis; each pixel in a selected row respectively outputs its reset Vrst and photo Vsig signals at the same time. That is, a row of pixels from the array 201 is selected by the control circuit 250 by sending a row address from the control circuit 250 to the row decoder 220. The row decoder 220 decodes the row address and operates the row driver 210. The row driver 210 asserts the ROW control signal on a line coupled to the row select transistor 112 of each pixel in the selected row.

The assertion of the ROW control signal causes the row select transistor 112 of each pixel 100 in the selected row to conduct. As previously described with respect to the processing performed within each pixel, this permits each pixel 100 in the selected row to output its reset Vrst and photo Vsig signals at node B, and for the pixel reading circuit 150 associated with each pixel to output a corresponding signal at node D. The control circuit 250 operates the column decoder 270 to cause the column driver circuit 260 to select a column from the selected pixels. The output from node D of the pixel in the selected column of the selected row is routed via node D' to an analog to digital converter 280, which converts the output to a digital value. The digital value is processed by an image processor 290. Once the signals from each pixel of the selected row have been output, the control circuit 250 selects another row. This process is continued until every row of the array 201 has been processed. The imager 200 may include an output circuit 295 for outputting a digital signal corresponding to the complete image. The imager 200 may further include additional well known components, such as a lens assembly, which are not illustrated in order to avoid cluttering the figure.

The above described rolling shutter operation is not suitable for imaging scenes with objects having significant motion because each row is effectively imaged at a different time. In such scenes, an object may have moved significantly during the processing time between the different selected rows. Additionally, there is often a need to precisely control integration (i.e., exposure) time of a pixel on a frame basis. Control of the integration time on a frame basis would permit more accurate exposure, particularly of images having relatively bright and/or relatively dark areas. Some imagers utilize mechanical shutters, which may be difficult to control precisely. Other images utilize electronic shutters, which include storage capacitors. Although electronic shutters can be more easily controlled, the use of capacitors has some disadvantages including, for example, a decreased pixel fill factor, decreased efficiency in pixel charge transfer, and increased susceptibility to noise. Accordingly, there is a need for a pixel architecture that includes an electronic shutter control capable of operating in a full frame mode, but which is relatively immune to the known disadvantages associated with a pixel architecture featuring a capacitor.

SUMMARY OF THE INVENTION

Exemplary embodiments of the method and apparatus of the present invention provide a pixel architecture with an electronic shutter circuit comprising a shutter transistor and a pinned diode. The pinned diode is utilized as a charge storage device, while the shutter transistor is used along with a transfer transistor to control charge transfer from a photodiode to a source region coupled to the gate of a source follower transistor.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
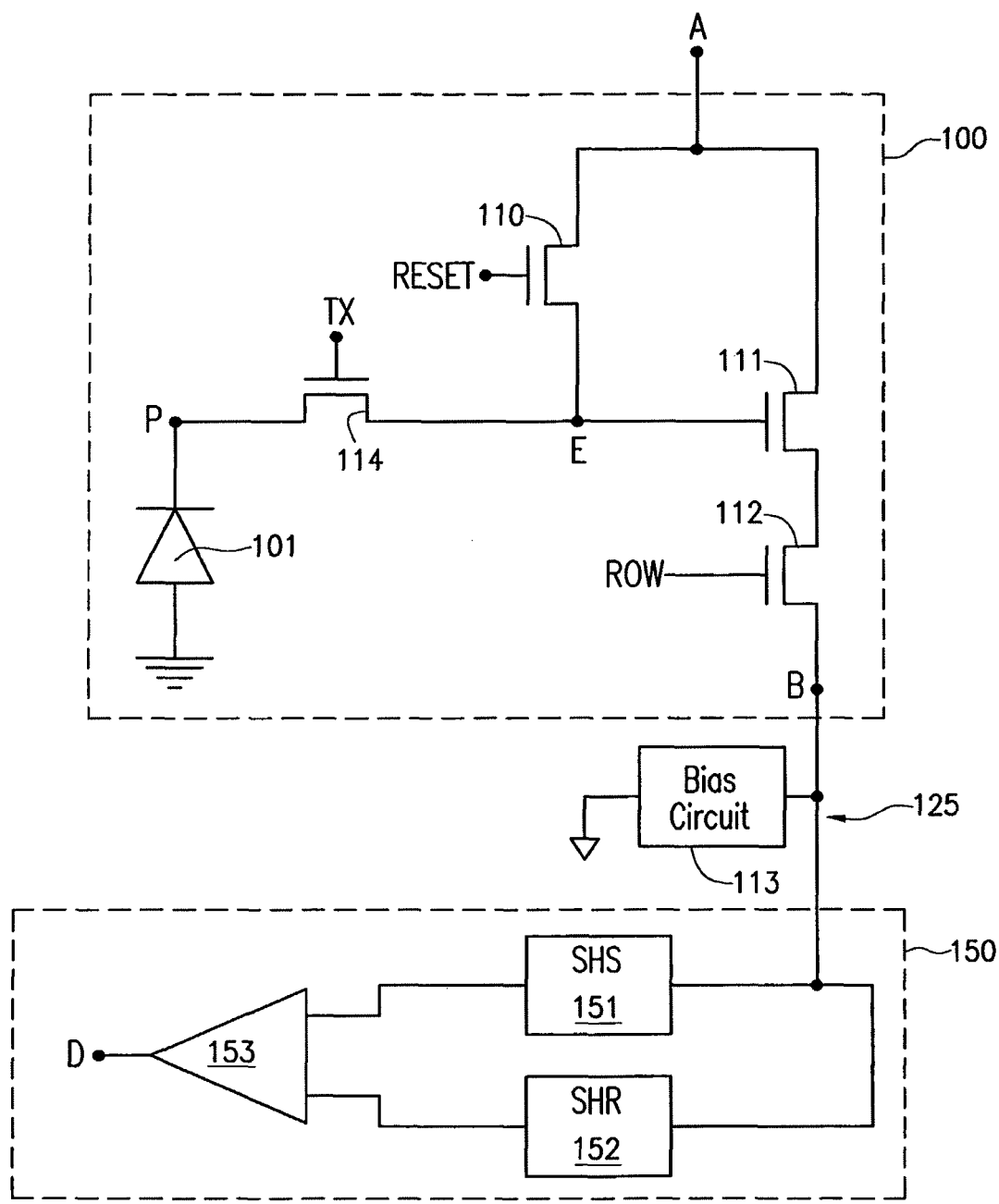
FIG. 1 illustrates a conventional pixel and associated pixel reading circuit.
Figure 3:
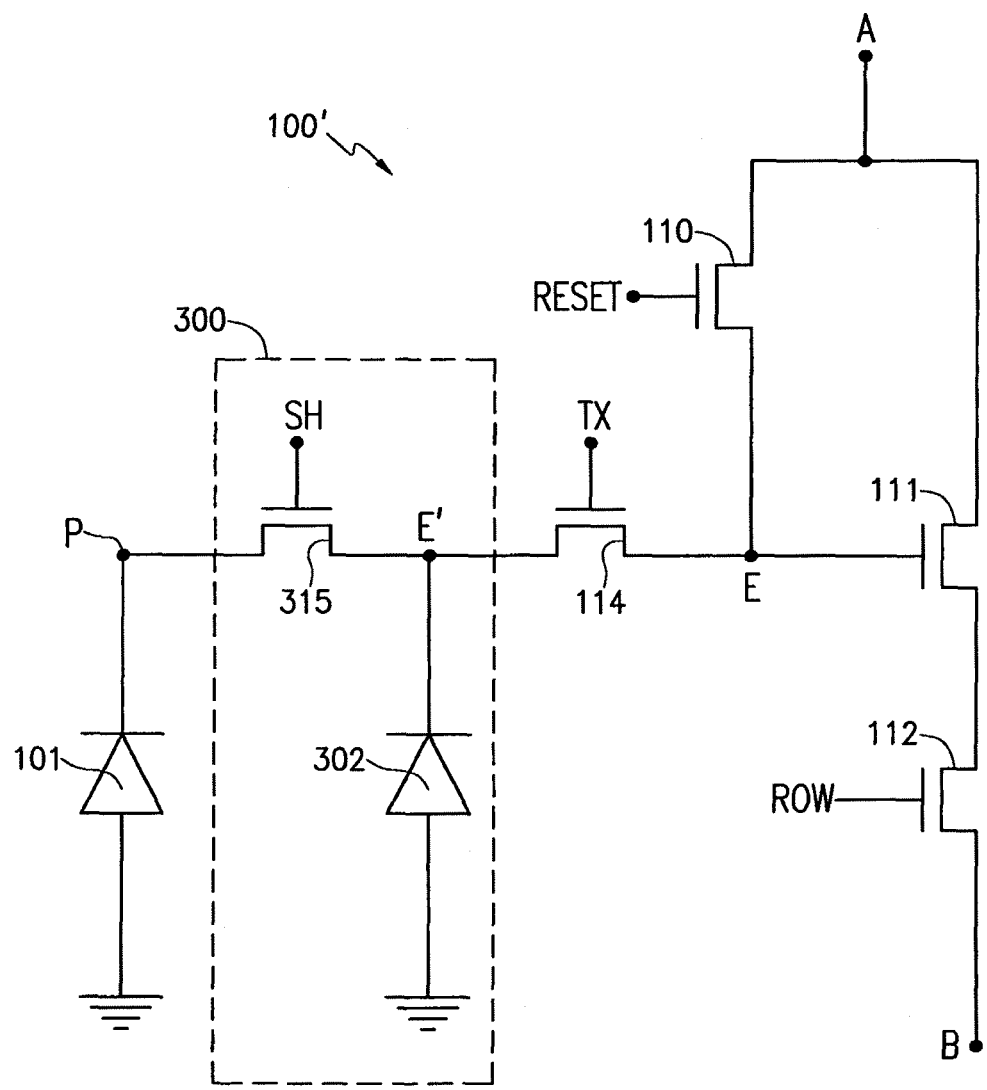
FIG. 3 illustrates a pixel in accordance with one embodiment of the present invention.

Now referring to the drawings, where like reference numerals designate like elements, there is shown in FIG. 3, a pixel 100' having an architecture in accordance with one embodiment of the invention. The pixel 100' includes several components found in pixel 100 (FIG. 1), but the illustrated pixel 100' includes additional circuitry in the form of an electronic shutter 300.

Node A of the pixel 100' is coupled to a voltage source, which is typically a pixel array supply voltage VAAPIX. Node B is an output node. The pixel 100' outputs its reset signal Vrst and the photo signal Vsig, at different times through node B.

The photodiode 101 is typically a pinned photodiode, and produces photo generated charges, the number of which varies in accordance with incident light. The photo generated charges accumulate at node P. Typically, the incident light arrives from a subject after being focused by a lens assembly (not illustrated).

The electronic shutter 300 includes a pinned diode 302 and a shutter control transistor 315. The shutter control transistor 315 has one source/drain coupled via node P to the photodiode 101 and another source/drain coupled to a charge storage node E'. The gate of the shutter control transistor 315 accepts a control signal SH. The control signal SH is used to control the conductivity of the shutter control transistor 315, and thus control whether photo generated charges accumulated at node P are transferred to the charge storage node E'. This shutter control is on a global basis for all imaging pixels of a pixel array.

The charge storage node E' is also coupled to the transfer transistor 114 and the pinned diode 302. The pinned diode is also coupled to a predetermined voltage source. The predetermined voltage applied to pinned diode 302 is illustrated as ground potential, however, the predetermined voltage can be any fixed potential, for example, the substrate voltage (Vss). The pinned diode 302 can be any type of pinned diode, but in one exemplary embodiment the pinned diode 302 is a pinned photodiode similar to photodiode 101. More specifically, the photodiode 101 receives incident light while the pinned diode 302 is blocked from receiving incident light. Accordingly, the photodiode 101 produces charges in response to incident light while the pinned diode, being opaque, does not.

The reset transistor 110 has its source and drain coupled between node E and supply voltage node A, while the source follower transistor 111 has its source and drain coupled in series between node A and a source/drain of the row select transistor 112. Another source/drain of the row select transistor 112 is coupled to node B. The source follower transistor 111 has its gate directly coupled to stage node E. The transfer gate transistor 114 acts as a switch to control the flow of charge from the charge storage node E' to node E and the gate of the source follower transistor 111. The shutter control transistor 315 acts as a switch between nodes P and E'.

Figure 2:
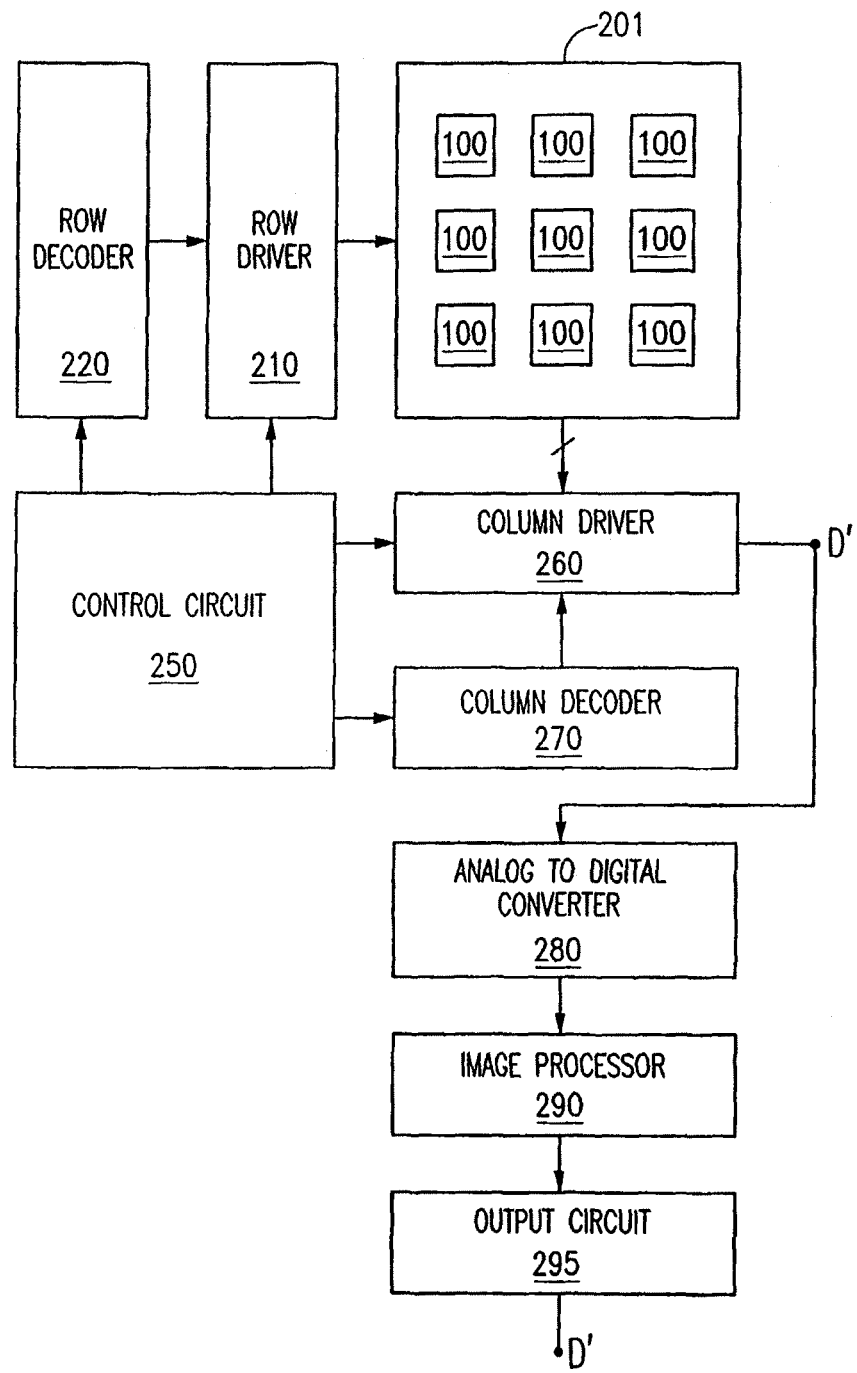
FIG. 2 illustrates a conventional imaging system.
Figure 4A:
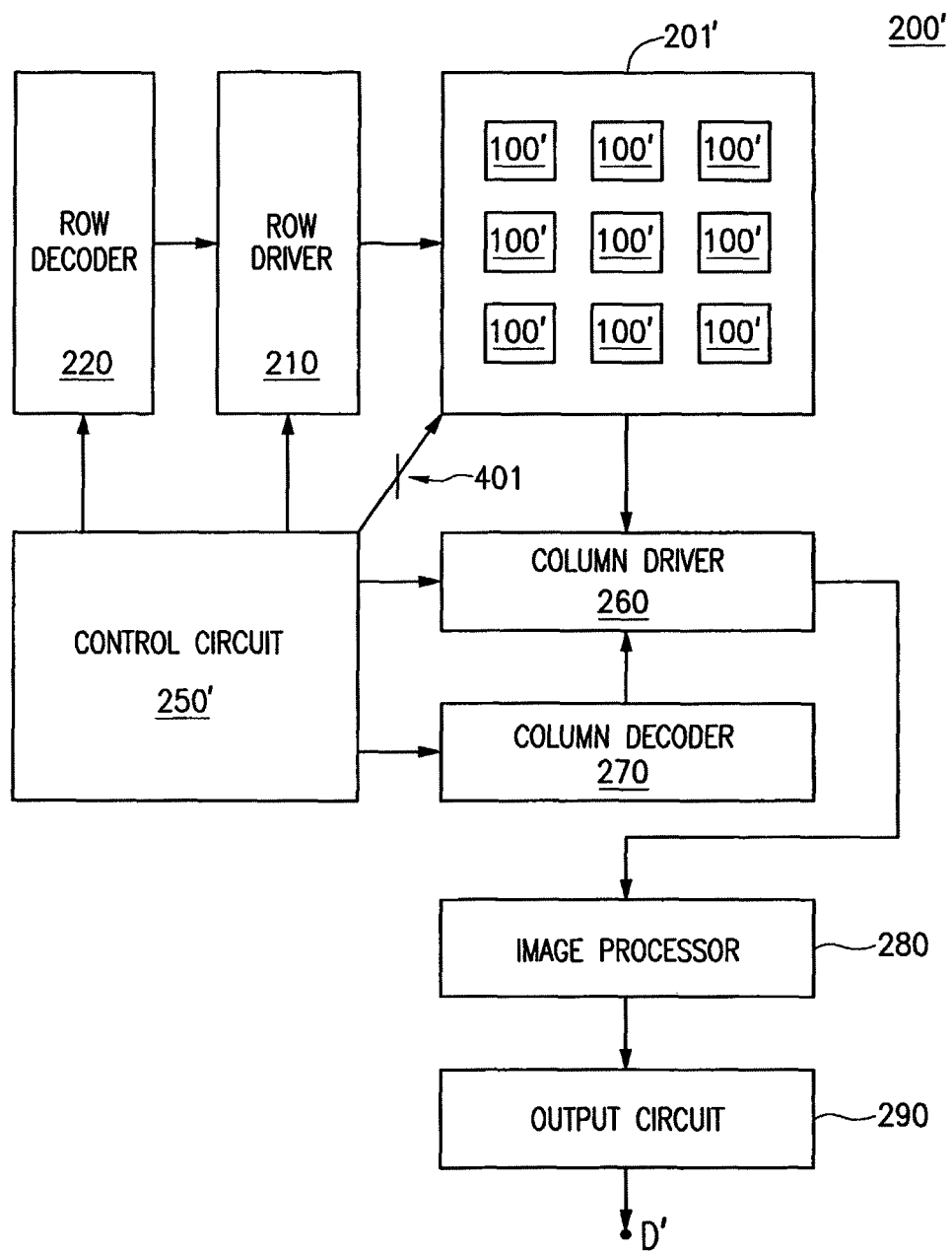
FIG. 4A illustrates an imager incorporating the pixel of FIG. 3.

FIG. 4A is a block diagram of an imager 200' constructed in accordance with one exemplary embodiment of the invention. The imager 200' includes similar components as imager 200 (FIG. 2), however, imager 200' features a pixel array 201' having the pixels 100' incorporating the electronic shutter 300. The imager 200' additionally includes a new control circuit 250'.

Figure 4B:
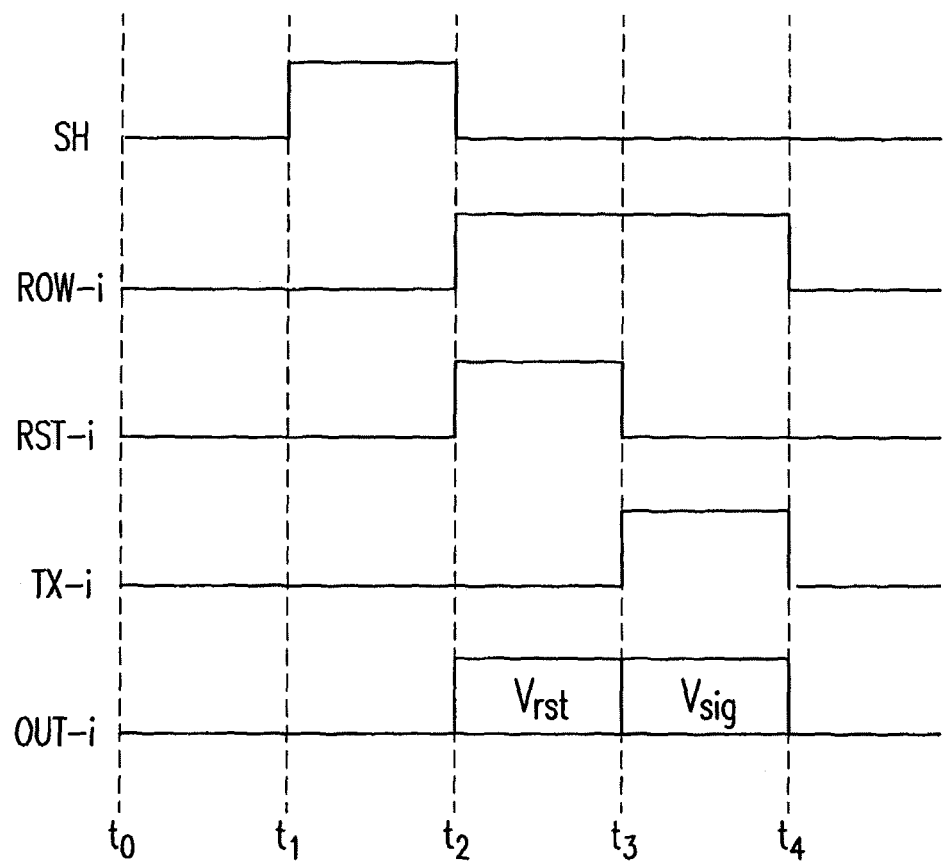
FIG. 4B is a timing diagram relating to the operation of the imager of FIG. 4A.

FIG. 4B is a timing diagram illustrating the timing sequence of control signals, which are controlled by the control circuit 250' to operate the imager 200'. The SH control signal is a global signal common to each shutter control transistor 315 of each pixel 100' in the pixel array 201'. The ROW-i, RST-i, TX-i, and OUT-i signals respectively represent the ROW control signal, RST control signal, TX control signal, and pixel output at node B of each pixel 100' in the selected row.

Time t0 denotes the beginning of imaging operations for a new frame and the start of the integration period. At time t0 each of the control signals SH, ROW-i, RST-i, TX-i is asserted low and there is no pixel output OUT-i.

Time t1 denotes the beginning of the global charge transfer period. The SH control signal is asserted high, causing the shutter control transistor 315 in each pixel 100' of the pixel array 201' to conduct. This permits, in each pixel 100', photo generated charges that were accumulated during the integration period to be transferred to the charge storage node E'.

Time t2 denotes the end of the global charge transfer period. The SH control signal is asserted low, causing the shutter control transistor 315 in each pixel 100' of the pixel array 201' to not conduct. As a result, any additional photo generate charges produced after time t2 are not added to the charge already accumulated at node E'. The new integration time starts once the SH control signal goes low.

Time t2 also denotes the beginning of a row read out operation. Accordingly, the ROW-i control signal is asserted high, causing the row select transistor 112 in each pixel 100' of the selected row to conduct. Simultaneously, the RST-i control signal is also asserted high, causing the reset transistor 110 of each pixel 100' in the selected row to conduct. As a result, each pixel 100' in the selected row outputs a reset signal Vrst at node B.

At time t3, the RST-i control signal is asserted low while the TX-i control signal is asserted high. As a result, the reset transistor 110 in each pixel 100' of the selected row stops conducting and the transfer transistor 114 of each pixel 100' of the selected row begins to conduct. As a result, in each pixel 100' of the selected row, the charge accumulated during the integration period, which was stored at node E', is coupled to the gate of the source follower transistor 111, causing each pixel 100' of the selected row to output the photo signal Vsig.

Time t4 denotes the end of row read out for the selected row. The ROW-i and TX-i control signals are each asserted low, causing the row select transistor 112 and transfer transistor 114 of each pixel 100' in the selected row to stop conducting.

The operations described above between time t2 and time t4 can then be repeated for a different one of the plurality of rows in the pixel array 201', until each row in the pixel array 201' has been read as described above.

Figure 5:
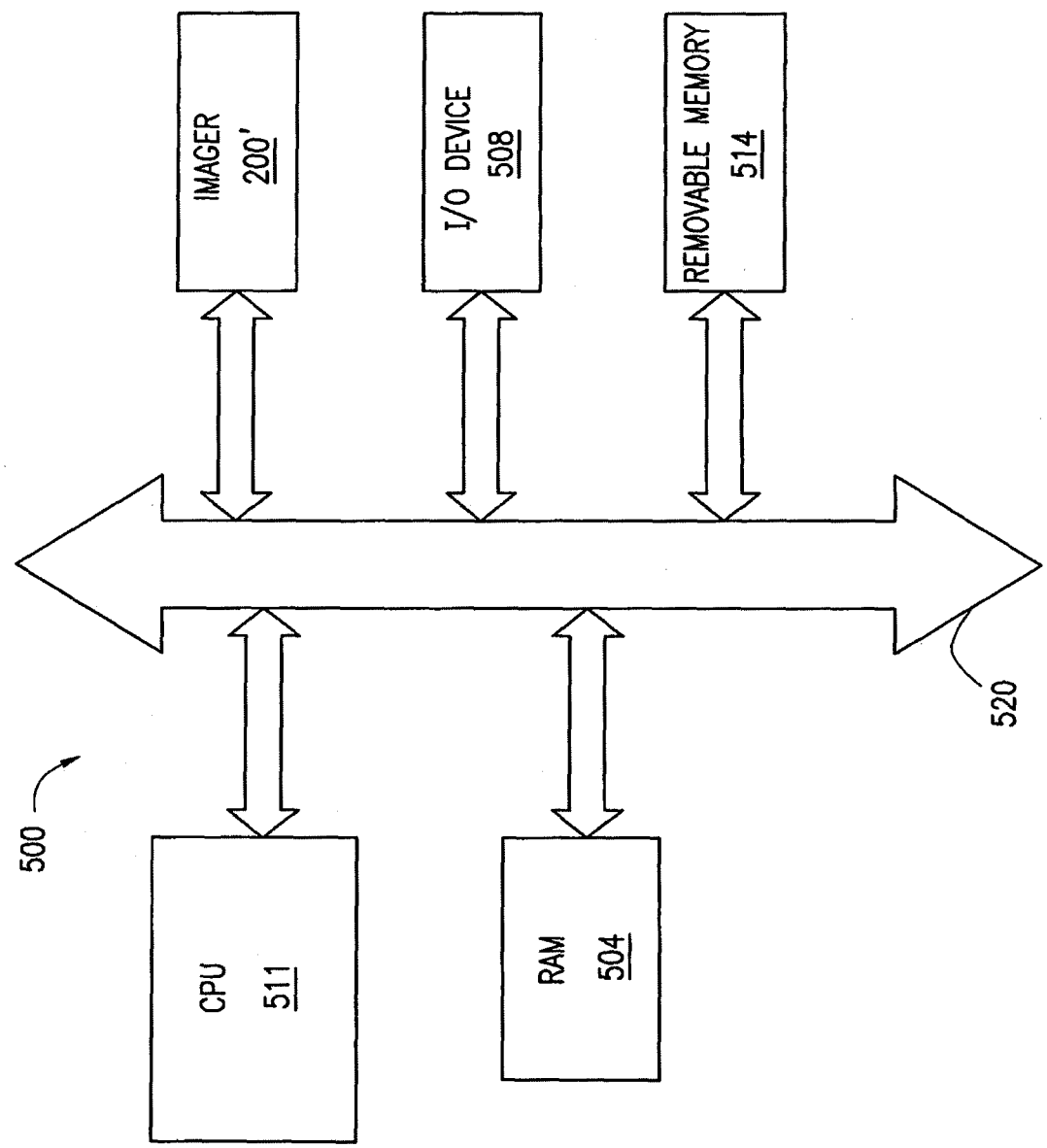
FIG. 5 illustrates a system incorporating the imager of FIG. 4.

FIG. 5 shows system 500, a typical processor system modified to include an imager 200' (FIG. 4) of the invention. The system 500 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 500, for example a camera system, generally comprises a central processing unit (CPU) 511, such as a microprocessor, that communicates with an input/output (I/O) device 506 over a bus 520. Imaging device 200' also communicates with the CPU 511 over the bus 520. The system 500 also includes random access memory (RAM) 504, and can include removable memory 514, such as flash memory, which also communicate with the CPU 511 over the bus 520. The imager 200' may be combined with a processor, such as a CPU, digital signal processor, or microprocessor, with or without memory storage on a single integrated circuit or on a different chip than the processor.

The present invention is therefore directed to a pixel architecture having an electronic shutter comprising a shutter transistor and a pinned diode. The pinned diode is used as a charge storage device to permit every pixel of the array to image simultaneously. The shutter transistor is used, in conjunction with the transfer transistor, to controllably isolate the imaged charge from the floating diffusion (node E). This permits the pixels output signals to be processed by the image processor in a conventional manner. Preferably, the transfer transistor and shutter transistor of any pixel are never simultaneously in a conducting state.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A circuit for storing and transferring charge from a light sensitive element of a pixel to a floating diffusion node, said circuit comprising:
    a pinned diode charge storage element;
    a shutter control element, said shutter control element having a shutter control input coupled to said light sensitive element and an output coupled to said pinned diode charge storage element; and
    a transfer control element for transferring charge from said pinned diode charge storage element to said floating diffusion node.

2. The circuit of claim 1, wherein said pinned diode charge storage element comprises a pinned photodiode.

3. The circuit of claim 1, further comprising a light shielding element arranged to shield said pinned diode charge storage element from substantially all light incident upon said light sensitive element.

4. The circuit of claim 1, wherein said shutter control element is a transistor having one source/drain coupled to said pinned diode charge storage element and another source/drain coupled to said light sensitive element.

5. The circuit of claim 1, wherein said transfer control element is a transistor having one source/drain coupled to said pinned diode charge storage element and another source/drain coupled to said floating diffusion node.

6. A pixel comprising:
    a light sensitive element for generating photo generated charge;
    a shutter circuit for receiving charge from said light sensitive element, said shutter circuit comprising:
        a pinned diode charge storage element; and
        a shutter control element, said shutter control element having an input coupled to said light sensitive element and an output coupled to said pinned diode charge storage element; and
    a transfer control element for transferring charge from said pinned diode charge storage element to a floating diffusion node.

7. The pixel of claim 6, wherein said pinned diode charge storage element comprises a pinned photodiode.

8. The pixel of claim 6, wherein said light sensitive element is a photodiode.

9. The pixel of claim 8, wherein said photodiode is a pinned photodiode.

10. The pixel of claim 6, wherein said shutter control element is a transistor having a gate configured to receive a global shutter control signal.

11. The pixel of claim 10, wherein said transfer control element is a second transistor having a gate configured to receive a row readout signal.

12. A method of operating an imager, the method comprising:
    in each pixel of a plurality of pixels:
        generating charge in a light sensitive element based on a received incident light;
        selectively coupling said light sensitive element to a pinned diode charge storage element;
        storing generated charges from said light sensitive element at said pinned diode charge storage element; and
        selectively coupling said pinned diode charge storage element to a floating diffusion node.

13. The method of claim 12, further comprising:
    storing charges from said pinned diode charge storage element at said floating diffusion node; and
    selectively coupling said floating diffusion node to an output line using readout circuitry.

14. The method of claim 13, wherein selectively coupling said floating diffusion node to said output line using readout circuitry further comprises activating a row select transistor to transfer said charge from said floating diffusion node across an amplifier circuit onto said output line.

15. The method of claim 12, further comprising:
    prior to selectively coupling said pinned diode charge storage element to said floating diffusion node, selectively coupling said floating diffusion node to a reset voltage.

16. The method of claim 12, further comprising:
    after selectively coupling said pinned diode charge storage element to said floating diffusion node, selectively coupling said floating diffusion node to a reset voltage.

17. The method of claim 12, further comprising, prior to selectively electrically coupling said pinned diode charge storage element to said floating diffusion node, selectively de-coupling said pinned diode charge storage element to said light sensitive element.

18. The method of claim 12, wherein selectively electrically coupling said light sensitive element to said pinned diode charge storage element further comprises electrically coupling said respective light sensitive elements in each pixel of said plurality of pixels to respective pinned diode charge storage elements at a same time.

19. The method of claim 18, wherein said plurality of pixel comprises pixels arranged in rows and columns, and wherein selectively electrically coupling said pinned diode charge storage element to said floating diffusion node further comprises electrically coupling said respective pinned diode charge storage element in each pixel of said plurality of pixels to respective floating diffusion nodes on a row-by-row basis.

\* \* \* \* \*